(12) United States Patent
Yoshida et al.

(10) Patent No.: US 11,124,050 B2
(45) Date of Patent: Sep. 21, 2021

(54) ALUMINUM ALLOY DOOR BEAM

(71) Applicant: Kobe Steel, Ltd., Kobe (JP)

(72) Inventors: Masatoshi Yoshida, Kobe (JP); Takahiro Shikama, Shimonoseki (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/838,071

(22) Filed: Apr. 2, 2020

(65) Prior Publication Data

US 2020/0369129 A1 Nov. 26, 2020

(30) Foreign Application Priority Data

May 22, 2019 (JP) .............................. JP2019-096386

(51) Int. Cl.
*B60J 5/04* (2006.01)
*C22C 21/10* (2006.01)

(52) U.S. Cl.
CPC ............. *B60J 5/0447* (2013.01); *C22C 21/10* (2013.01); *Y10T 428/12764* (2015.01)

(58) Field of Classification Search
None
See application file for complete search history.

(56) References Cited

U.S. PATENT DOCUMENTS

| 6,408,591 | B1 * | 6/2002 | Yamashita | B60J 5/0444 |
| | | | | 296/146.6 |
| 10,562,087 | B2 * | 2/2020 | Morita | B60J 5/0443 |
| 10,814,368 | B2 * | 10/2020 | Morita | B60J 5/0443 |
| 2019/0152304 | A1 | 5/2019 | Yoshida et al. | |
| 2019/0389286 | A1 | 12/2019 | Yoshida et al. | |

FOREIGN PATENT DOCUMENTS

JP 6322329 B1 5/2018

* cited by examiner

*Primary Examiner* — Daniel J. Schleis
(74) *Attorney, Agent, or Firm* — Oblon, McClelland, Maier & Neustadt, L.L.P.

(57) ABSTRACT

A door beam including an aluminum alloy extruded material of a closed section structure having a welded part along the longitudinal direction, webs and an outer flange are inhibited from buckling and further the welded part in the outer flange is inhibited from breaking at the time of collision. In a cross section of an aluminum alloy extruded material perpendicular to the extrusion direction, each of the webs includes an outer part connected to the outer flange and an inner part connected to an inner flange and the thickness of the outer part is larger than the thickness of the inner part. Each of the outer parts is positioned in a region outside a cross section center of the aluminum alloy extruded material in the vehicle body width direction.

8 Claims, 5 Drawing Sheets

ALUMINUM ALLOY DOOR BEAM

FIELD OF INVENTION

The present invention relates to an aluminum alloy door beam that: comprises an aluminum alloy extruded material having a welded part formed during extrusion molding in an outer flange positioned on a collision side; and is used as a door reinforcement of an automobile such as a passenger car or a truck.

BACKGROUND OF INVENTION

An automobile is equipped with various types of shock absorbers to protect an occupant from impact at the time of collision for safety measures against side collision and a door beam for reinforcement has been installed in the interior of an automobile side door. The door beam is required not only to prevent an obstacle from invading inside a door but also to transfer a collision load to an automobile frame part to support the door and absorb energy at the time of collision while the door beam itself bends in case of side collision. In recent years, the demand for weight reduction of a door beam has been increasing in consideration of the global environment.

A door beam is required not only to secure a high deformation load during bending deformation but also to secure the deformation load stably even after reaching a maximum load in order to absorb energy efficiently at the time of collision. In order to attain such functions, a higher strength material is required to be applied to a door beam and a hollow extruded material of an aluminum alloy or the like has also been applied.

In an aluminum alloy extruded material, a hollow cross-sectional shape uniform in the longitudinal direction can be obtained in advance by hot extrusion processing and hence there is the advantage that no joining cost is required unlike the case of forming and joining a rolled sheet material to form a closed cross section. Further, a door beam comprising an aluminum alloy extruded material: does not easily buckle in comparison with a door beam of a hat-shaped or W-shaped open cross section comprising a rolled sheet material; has a high bending strength; and thus has the characteristic of being excellent in deformation strength and energy absorbability (EA) at the time of collision. In addition, an aluminum alloy extruded material has the advantage that it can be manufactured relatively easily even with a 7000 series aluminum alloy that is not easily processed with a rolled sheet material and has a relatively high strength.

A door beam comprising an aluminum alloy extruded material usually comprises a pair of tabular flanges parallel with each other and a pair of tabular webs connecting both the flanges vertically (refer to Japanese Patent No. 6322329) and the paired flanges are arranged outside and inside in a vehicle body width direction in a door.

From the viewpoint of inhibiting the weight of a door beam from increasing and enhancing bending strength, it is effective to reduce a cross-sectional area near a neutral axis of bending and increase a cross-sectional area in a region far from the neutral axis. A door beam comprising an aluminum alloy extruded material therefore is strongly required to reduce the thickness of webs constituting a cross section as much as possible.

If a web is too thin however, the web is likely to buckle. Problems arising when a web buckles and deforms at the time of collision are that the web height reduces abruptly and, with this, a deformation load reduces and EA deteriorates at the time of collision. That is, a web thickness is required to be a minimum thickness that can reduce buckling deformation and secure a predetermined EA at the time of collision.

Meanwhile, an aluminum alloy extruded material (hollow cross section) as a structural member of this kind is usually manufactured by porthole extrusion that is less expensive than indirect extrusion using a mandrel except 5000 series (Al—Mg series) aluminum alloy from the viewpoint of manufacturing cost. The porthole extrusion, as is well known, is carried out by using a porthole die formed by combining a mandrel body having a plurality of portholes and a die. A material of an aluminum alloy billet pushed into the porthole die: is divided by the portholes; then surrounds the mandrel, is welded and integrated again; and is formed into an extruded material of a hollow crass section with the inner surface shaped by the mandrel and the outer surface shaped by the die.

An aluminum alloy extruded material (hollow cross section) manufactured by porthole extrusion therefore has a welded part inevitably, the welded part and the part other than the welded part (normal part) have microstructures different from each other and also different mechanical properties. Specifically, the breakage limit of the welded part is lower than the normal part and a problem here is that bending strength as a structural member deteriorates by the breakage of the welded part in accordance with a deformation form at the time of collision and the position of the welded part. When a high strength material is used as the material in particular, generally the strength at high temperature also increases, thus extrusion processing itself becomes difficult, and characteristics tend to vary at the welded part.

Meanwhile, in Japanese Patent No. 6322329, a door beam comprising an aluminum alloy extruded material is described and welded parts are formed in the centers of both flanges. To form welded parts in the centers of both flanges in this way is preferable from the viewpoint of optimizing the flow of the material during extrusion processing. Further, as described in Japanese Patent No. 6322329, a tensile or compressive stress in the longitudinal direction acts on a flange of a door beam almost uniformly over the whole width by bending deformation at the time of collision. As a result, even if the characteristics at the welded parts are lower than a normal part, the deformation at the welded parts follows the deformation of the normal part occupying most of a cross section. No major problems therefore have heretofore occurred at the time of collision (at the time of bending deformation) with a door beam of this type.

SUMMARY OF INVENTION

A cross-sectional shape of a conventional aluminum alloy extruded material 11 used for a door beam is shown in FIG. 8A The extruded material 11 comprises a pair of flanges (outer flange 12 positioned outside in a vehicle body width direction and inner flange 13 positioned inside in the vehicle body width direction) parallel with each other and a pair of webs 14 and 15 that are perpendicular to both the flanges 12 and 13 and connect both the flanges 12 and 13. Both the flanges 12 and 13 are plate-shaped and have a substantially uniform thickness along a width direction (horizontal direction in FIG. 8A) respectively. Further, the webs 14 and 15 are plate-shaped and have a substantially uniform thickness along a height direction (vertical direction in FIG. 8A)

respectively, except fillets at the joints with the flanges 12 and 13. Welded parts 16 and 17 are formed in both the flanges 12 and 13.

When a material of a higher strength is used for such an aluminum alloy extruded material 11, a work hardening index (n value) reduces as a proof stress of the material increases and hence bending deformation of a door beam at the time of collision tends to concentrate near a loading point in a longitudinal direction.

When a collision load P acts on a door beam comprising an aluminum alloy extruded material 11, a compressive stress acts on the extruded material 11 in a region outside (collision side) a neutral axis N of bending in the vehicle body width direction and a tensile stress acts in a region inside (anti-collision side) the neutral axis N of bending in the vehicle body width direction. Here, an assumed neutral axis N of bending is positioned so as to; pass through a cross section center O of the aluminum alloy extruded material 11; and be perpendicular to the direction of the collision load P (parallel with the outer flange 12).

When a collision load P acts, the aluminum alloy extruded material 11 bends and deforms around the loading point along the longitudinal direction. When the webs 14 and 15 buckle during the bending deformation, as shown in FIG. 8B, bending deformation of expanding the webs 14 and 15 outside a cross section is generated and the vertexes of the bend are positioned slightly closer to the cross section center O in the region where the compressive stress acts (region between the cross section center O and the outer flange 12). When the webs 14 and 15 buckle as stated above, the cross section of the extruded material 11 crushes and the deformation strength and EA of a door beam deteriorate significantly.

When the webs 14 and 15 buckle and the bending deformation as stated above is generated in the webs 14 and 15, a bending moment is added to the outer flange 12 from the joints between the webs 14 and 15 and the outer flange 12. If this causes the outer flange 12 to buckle, as shown in FIG. 8B, deformation of forming an inward convex in a cross section is generated in the outer flange 12. Along with the buckling deformation in the webs 14 and 15 and the outer flange 12 as stated above, a tensile stress in the width direction in a cross section is generated in the outer flange 12. Then, if a high tensile stress is added to the welded part 16 of a low breakage limit, breakage tends to occur at the welded part 16 and this causes the deformation strength and EA of a door beam to deteriorate significantly.

As stated above, when an aluminum alloy extruded material of a high strength is applied to the material of a door beam, buckling tends to occur in the webs 14 and 15 and the outer flange 12 near the loading point at the time of collision.

The present invention has been established in view of the above problems and a main object of the present invention is to provide an aluminum alloy extruded material that makes webs not easily buckle in bending deformation at the time of collision. Further, another object of the present invention is to provide an aluminum alloy extruded material that makes a welded part of an outer flange not easily break even when webs buckle and further the outer flange buckles in bending deformation at the time of collision.

An aluminum alloy door beam according to the present invention comprises an aluminum alloy extruded material of a closed section structure having a welded part along the longitudinal direction, and having an outer flange arranged outside (collision side) in a vehicle body width direction, an inner flange arranged inside (anti-collision side) in the vehicle body width direction, and at least two webs connecting the outer flange and the inner flange, and the welded part is formed in the outer flange. The welded part may be formed also in the inner flange.

Then, an embodiment of the aluminum alloy extruded material is that, in a cross section of perpendicular to the extrusion direction of the aluminum alloy extruded material: each of the webs comprises an outer part connected to the outer flange and an inner part connected to the inner flange; the outer part is positioned in a region outside a cross section center of the aluminum alloy extruded material in the vehicle body width direction; and a thickness of the outer part is larger than a thickness of the inner part.

Further, another embodiment of the aluminum alloy extruded material is that, in a cross section of perpendicular to the extrusion direction of the aluminum alloy extruded material, a thick portion having a thickness larger than the other portion is formed near the welded part in the outer flange.

When webs of a door beam (aluminum alloy extruded material) buckle in bending deformation at the time of collision, vertexes of the webs in the bending deformation are formed generally in a region where a compressive stress is added in the bending deformation, namely in a region between a neutral axis of bending and an outer flange. When the thickness of webs in an aluminum alloy extruded material is large in a region where a compressive stress is added in the bending deformation, the bending deformation of the webs does not easily occur and the webs are inhibited from buckling. Then, by inhibiting the webs from buckling, the buckling of the outer flange (inward convex deformation in a cross section) and breakage at the welded part are inhibited. As a result, the situation of deteriorating the deformation strength and EA of the door beam significantly can be avoided.

When such buckling as stated above occurs in webs and an outer flange of a door beam (aluminum alloy extruded material) in bending deformation at the time of collision, a tensile stress is generated in the outer flange in the width direction in a cross section. When the thickness of a portion near a welded part is large in the aluminum alloy extruded material, even when a tensile stress is generated in the outer flange in the width direction in a cross section, since a relatively thin portion other than the portion near the welded part deforms preferentially, the welded part can be inhibited from breaking. As a result, the situation of deteriorating the deformation strength and EA of the door beam significantly can be avoided.

DESCRIPTION OF EMBODIMENTS

Some preferable embodiments on a cross-sectional shape of an aluminum alloy extruded material used as a material of an aluminum alloy door beam according to the present invention are explained hereunder in reference to FIGS. 1 to 7.

Figure 1:
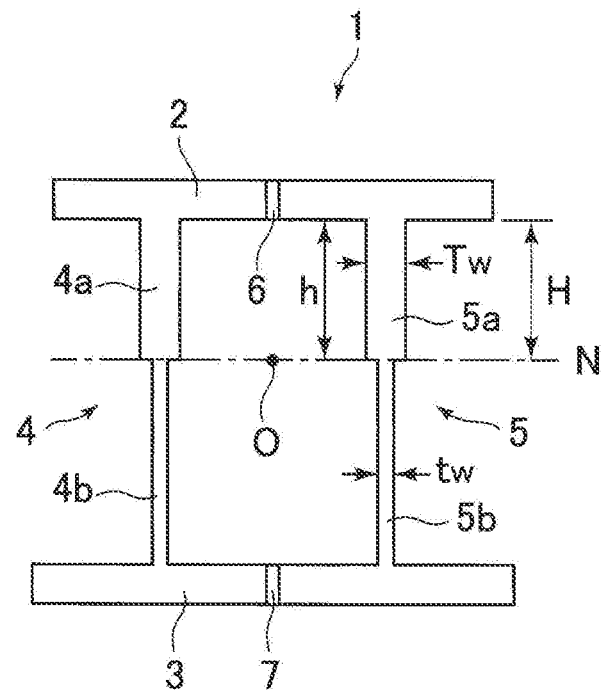
FIG. 1 is a sectional view perpendicular to the longitudinal direction of an aluminum alloy extruded material used for a door beam according to the present invention and shows an example of preferable embodiments.

An aluminum alloy extruded material 1 shown in FIG. 1 comprises a pair of flanges (outer flange 2 and inner flange 3) and a pair of (two) webs 4 and 5 connecting both the flanges. The outer flange 2 and the inner flange 3 are parallel with each other and the webs 4 and 5 are perpendicular to both the flanges 2 and 3. The outer flange 2 and the inner flange 3 are plate-shaped respectively, have a substantially uniform thickness along the width direction (horizontal direction in FIG. 1) respectively, and have welded parts 6 and 7 near the centers in the width direction respectively.

In the aluminum alloy extruded material 1 shown in FIG. 1, the webs 4 and 5 are plate-shaped respectively but each of them comprises two parts having different thicknesses and, on this point, the aluminum alloy extruded material 1 is different from the aluminum alloy extruded material 11 (refer to FIG. 8A) having webs 14 and 15 of a uniform thickness.

In the aluminum alloy extruded material 1 shown in FIG. 1, the web 4 comprises an outer part 4a of a large thickness and an inner part 4b of a smaller thickness, the outer part 4a is connected to the outer flange 2, and the inner part 4b is connected to the inner flange 3. The web 5 comprises an outer part 5a of a large thickness and an inner part 5b of a smaller thickness, the outer part 5a is connected to the outer flange 2, and the inner part 5b is connected to the inner flange 3. The outer parts 4a and 5a and the inner parts 4b and 5b have substantially uniform thicknesses along the height direction (vertical direction in FIG. 1) respectively, except fillets at the joints with the flanges 2 and 3.

In FIG. 1, O is a cross section center of the extruded material and N is a neutral axis of a bending load acting vertically on the outer flange 2 when full plastic bending is assumed, passes through the cross section center O, and is perpendicular to an assumed loading direction (parallel with the outer flange 2). The region of the larger thickness parts of the webs 4 and 5 (outer parts 4a and 5a) is the range from the outer flange 2 to the cross section center O (namely, from the outer flange 2 to the neutral axis N). When the height from the outer flange 2 to the cross section center O is defined as H and the height of the outer parts 4a and 5a in the webs 4 and 5 (distance from the outer flange 2 to the inside ends of the outer parts 4a and 5a) is defined ash, the expression h=H holds in this case.

Figure 2:
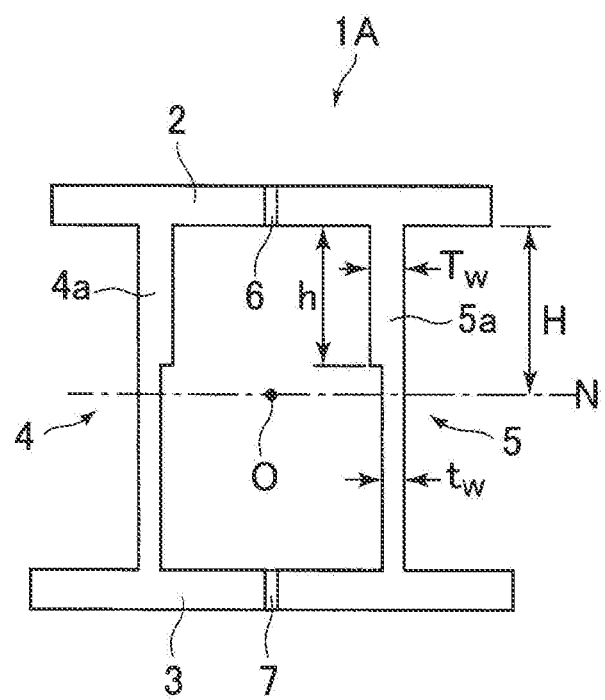
FIG. 2 is a sectional view perpendicular to the longitudinal direction of an aluminum alloy extruded material used for a door beam according to the present invention and shows another example of preferable embodiments.

In an aluminum alloy extruded material 1A shown in FIG. 2, the height h of outer parts 4a and 5a that are larger thickness parts of webs 4 and 5 is smaller than the height H from an outer flange 2 to a cross section center O, the expression h<H holds, and the aluminum alloy extruded material 1A is different from the aluminum alloy extruded material 1 shown in FIG. 1 on this point.

Figure 3:
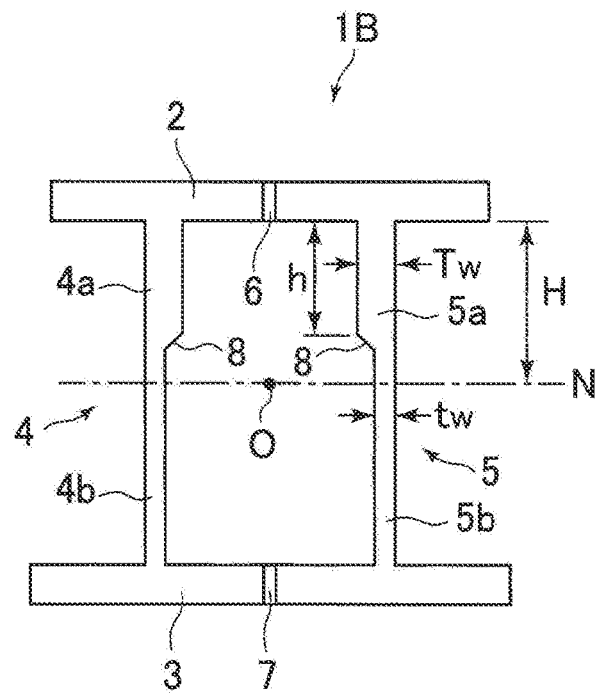
FIG. 3 is a sectional view perpendicular to the longitudinal direction of an aluminum alloy extruded material used for a door beam according to the present invention and shows yet another example of preferable embodiments.

In an aluminum alloy extruded material 1B shown in FIG. 3, transition regions 8 the thicknesses of which reduce gradually are formed as parts of inner parts 4b and 5b between outer parts 4a and 5a and the inner parts 4b and 5b of webs 4 and 5. The aluminum alloy extruded material 1B is different from the aluminum alloy extruded material 1A shown in FIG. 2 on this point. In an aluminum alloy extruded material according to the present invention, such a transition region 8 is allowed to exist.

Figure 8A:
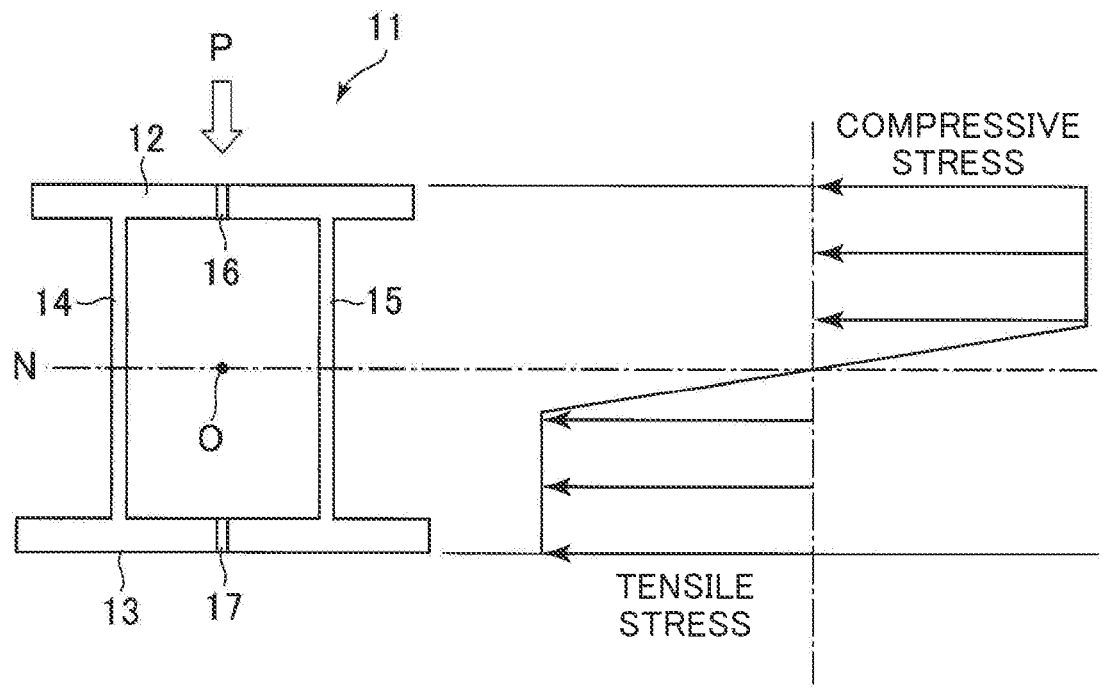
FIG. 8A is a sectional view perpendicular to the longitudinal direction of an aluminum alloy extruded material used for a conventional door beam and FIG. 8B is a schematic sectional view showing a form of buckling generated in webs and an outer flange at the time of collision.
Figure 8B:
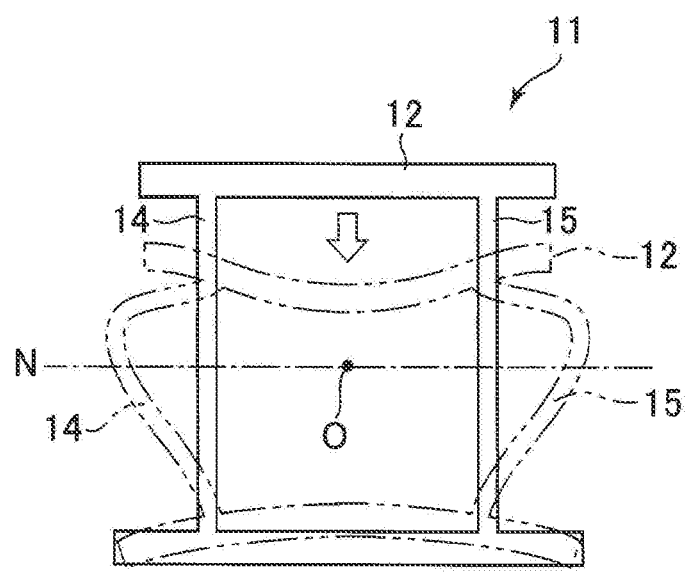

As it has been explained in reference to FIGS. 8A and 8B, when the aluminum alloy extruded material 11 (door beam) bends and deforms by a collision load, a compressive stress acts on the webs 14 and 15 in the region between the neutral axis N and the outer flange 12. When the aluminum alloy extruded material 11 comprises a high strength material, the webs 14 and 15 tend to buckle by the compressive stress. Then, when the webs 14 and 15 buckle, bending deformation of expanding the webs 14 and 15 outside a cross section is generated and the vertexes of the bend are positioned slightly closer to the neutral axis N in the region between the neutral axis N and the outer flange 12.

In an aluminum alloy extruded material (FIGS. 1 to 3) according to the present invention however, the outer parts 4a and 5a connected to the outer flange 2 are positioned in the region outside (collision side) the cross section center O (neutral axis N) of the extruded material in the vehicle body width direction and are thicker than the inner parts 4b and 5b. As a result, the bending strength of the outer parts 4a and 5a is high and the buckling (bending deformation of expanding the outer parts 4a and 5a outward) of the webs 4 and 5 is inhibited. The thickness of the outer parts 4a and 5a can be decided appropriately in consideration of action to inhibit a web from buckling, weight increase, and the magnitude of an assumed load. When the thickness difference between the outer parts 4a and 5a of a larger thickness and the inner parts 4b and 5b of a smaller thickness is too large however, underfill tends to occur during extrusion processing and a sound extruded material may not possibly be obtained. When the thickness of the outer parts 4a and 5a is defined as Tw and the thickness of the inner parts 4b and 5b is defined as tw therefore, it is preferable that the thickness Tw does not exceed 2.5 times the thickness tw.

When the webs 14 and 15 buckle in the aluminum alloy extruded material 11 shown in FIGS. 8A and 8B, the vertexes of the bending deformation generated in the webs 14 and 15 are positioned slightly closer to the neutral axis N in the region between the neutral axis N and the outer flange 12. If this point is taken into consideration, in the aluminum alloy extruded material according to the present invention, the height h of the outer parts 4a and 5a is preferably $H \times 2/3$ or more. Further, generally in order to minimize weight gain of the aluminum alloy extruded material and increase bending strength of the webs 4 and 5, it is preferable to increase the thickness in the region far from the neutral axis N and reduce the thickness near the neutral axis N. To that end, in an aluminum alloy extruded material according to the present invention, it is preferable to restrict the height h of the outer parts 4a and 5a of a large thickness to not larger than H.

In an aluminum alloy extruded material according to the present invention (FIGS. 1 to 3), since the thickness of the outer parts 4a and 5a in the webs 4 and 5 is large, the neutral axis N of bending is positioned outside (collision side) in the vehicle body width direction in comparison with a door beam 11 (refer to FIG. 8A) the webs of which have a uniform thickness over the whole height. As a result, a region where a compressive stress acts on the webs 4 and 5 at the time of collision reduces, a compressive stress acting on the outer flange 2 also reduces, buckling (bending deformation of expanding the outer parts 4a and 5a outward) of the webs 4 and 5 is inhibited, and buckling (deformation of forming an inward convex in a cross section) of the outer flange 2 is also inhibited.

In this way, in the aluminum alloy extruded material explained above (FIGS. 1 to 3), by forming the outer parts 4a and 5a having a relatively large thickness, buckling of the webs 4 and 5 is inhibited at the time of collision, buckling of the outer flange 2 is further inhibited, and, because of this, the breakage of the welded part 7 in the outer flange 2 is also inhibited. As a result, when a door beam comprises such an aluminum alloy extruded material, the situation of deteriorating deformation strength and EA significantly can be avoided.

Figure 4:
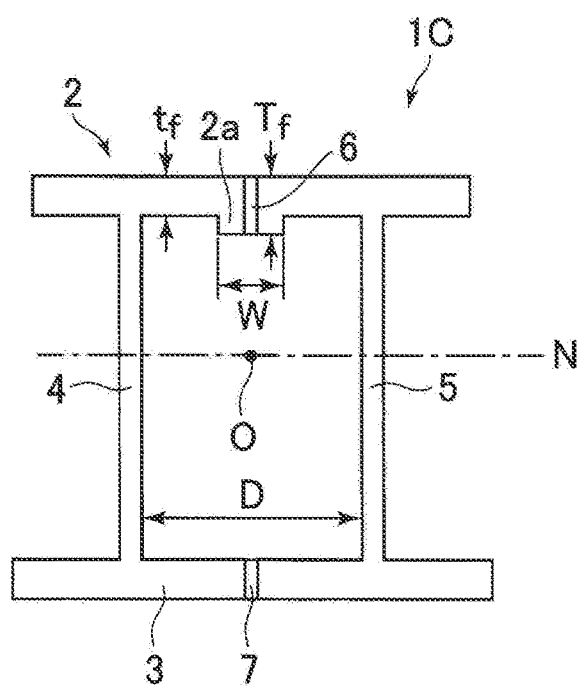
FIG. 4 is a sectional view perpendicular to the longitudinal direction of an aluminum alloy extruded material used for a door beam according to the present invention and shows yet another example of preferable embodiments.

In an aluminum alloy extruded material 1C shown in FIG. 4, a portion of an outer flange 2 near a welded part 6 is thicker than the other portion. The thick portion 2a and the other portion of a relatively small thickness in the outer flange 2 have substantially uniform thicknesses along the width direction (vehicle body vertical direction), respectively. The door beam is different from the conventional aluminum alloy extruded material 11 shown in FIG. 8A on the point that the outer flange 2 has such a thick portion 2a.

As it has been explained in reference to FIGS. 8A and 8B, when the aluminum alloy extruded material 11 comprises a high strength material and the aluminum alloy extruded material 11 (door beam) bends and deforms by a collision load, the webs 14 and 15 and the outer flange 12 tend to buckle and, on that occasion, a tensile stress is generated in the outer flange 12 in the width direction in a cross section. When the tensile stress exceeds the breakage limit of the welded part 16 in the outer flange 12, the welded part 16 breaks. Then when the aluminum alloy extruded material 11 comprises a high strength material, the breakage limit of the welded part 16 varies and the breakage limit of the welded part 16 may sometimes be relatively low.

In the aluminum alloy extruded material 1C however, since the portion (thick portion 2a) near the welded part 6 in the outer flange 2 is thick, a tensile stress generated in the outer flange 2 does not easily exceed the breakage limit of the welded part 6. Since the relatively thin portion other than the thick portion 2a deforms preferentially before a tensile stress exceeds the breakage limit of the welded part 6, the welded part 6 is inhibited from breaking. When a door beam comprises such an aluminum alloy extruded material, the situation of deteriorating deformation strength and EA significantly can be avoided. Further, even when the outer flange 2 buckles and bending deformation of forming an inward convex in a cross section (refer to FIGS. 8A and 8B) is generated in the outer flange 2, by increasing a plate thickness near the welded part 6, the vertexes of bending deformation are not easily formed at the welded part 6. As a result, it is possible to reduce a tensile stress generated in the outer flange 2 in the width direction in a cross section and reduce the risk of breaking the welded part 6.

Further, in the aluminum alloy extruded material 1C, deformation strength can be enhanced efficiently by increasing the thickness of the portion in the outer flange 2 far from the neutral axis N of bending. The increase of the thickness of the portion in the outer flange 2: is simultaneously effective for shifting the neutral axis N of bending outside (collision side) in the vehicle body width direction; contributes to the reduction of the region where a compressive stress acts on the webs 4 and 5 at the time of collision; and hence works effectively to prevent the webs 4 and 5 and the flange 2 from buckling.

In the aluminum alloy extruded material 1C according to the present invention, the width W of the thick portion 2a in the outer flange 2 is required to cover the whole welded part 6. Since the width of the welded part 6 is generally about 1 mm, the width W of the thick portion 2a is preferably 3 mm or more. On the other hand, if the width W of the thick portion 2a is too large, a deformation form similar to the aluminum alloy extruded material 11 (door beam) of no thickness difference is obtained, resultantly deformation may concentrate undesirably at the welded part 6 when the outer flange 2 buckles, bends, and deforms, and hence the width W of the thick portion 2a is preferably not larger than ⅓ of the distance D between webs 4 and 5.

The thickness Tf of the thick portion 2a is required to be to the extent of plastically deforming the portion other than the thick portion 2a preferentially when a tensile stress is loaded on the outer flange 2. The strength drop of the welded part 6 stays at 10% or less of the strength of a normal portion (portion other than the welded part 6) even when extrusion conditions are poor and hence the thickness Tf of the thick portion 2a in the outer flange 2 is made 10% or more larger than the thickness tf of the portion other than the thick portion 2a (Tf≥tf×1.1). On the other hand, if the thickness difference between the thick portion 2a and the portion other than the thick portion 2a is too large, underfill tends to occur during extrusion processing, a sound extruded material may not possibly be obtained, and hence it is preferable that the thickness Tf of the thick portion 2a does not exceed 2.5 times the thickness tf of the portion other than the thick portion 2a (Tf≤tf×2.5).

Figure 5:
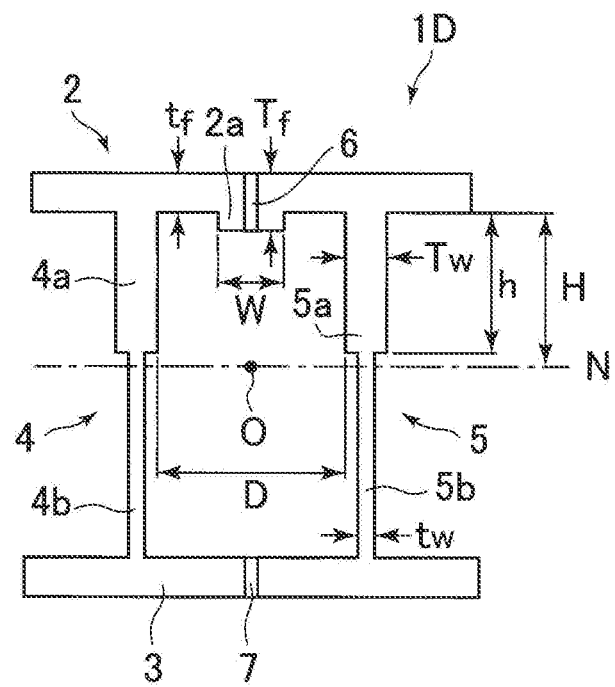
FIG. 5 is a sectional view perpendicular to the longitudinal direction of an aluminum alloy extruded material used for a door beam according to the present invention and shows yet another example of preferable embodiments.
Figure 6:
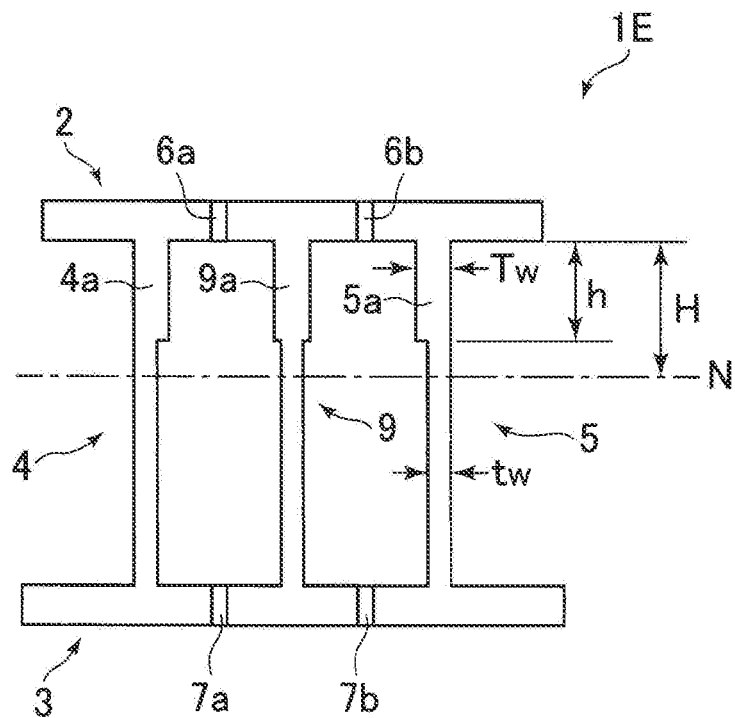
FIG. 6 is a sectional view perpendicular to the longitudinal direction of an aluminum alloy extruded material used for a door beam according to the present invention and shows yet another example of preferable embodiments.
Figure 7:
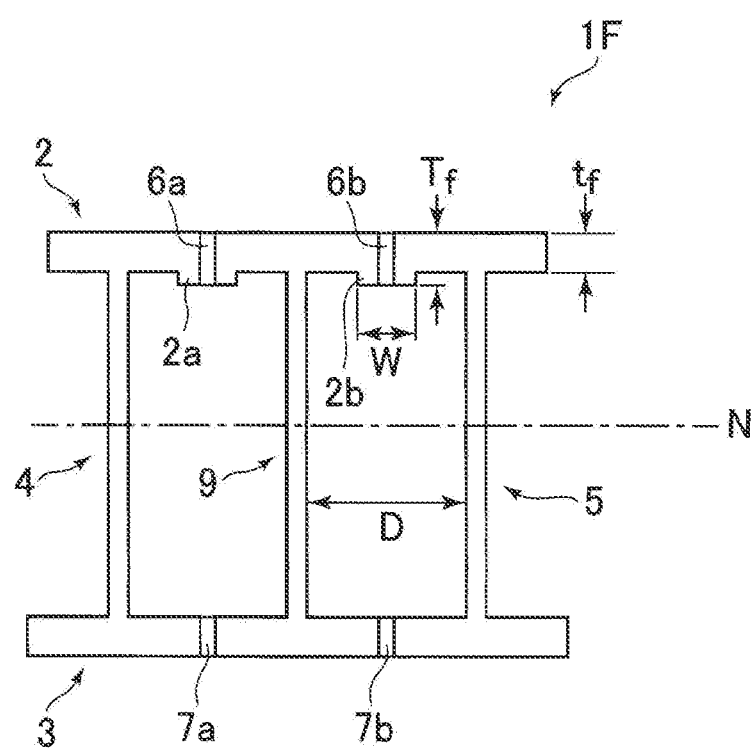
FIG. 7 is a sectional view perpendicular to the longitudinal direction of an aluminum alloy extruded material used for a door beam according to the present invention and shows yet another example of preferable embodiments.

In an aluminum alloy extruded material 1D shown in FIG. 5, webs 4 and 5 comprise outer parts 4a and 5a of a large thickness and inner parts 4b and 5b of a smaller thickness and a thick portion 2a of a thickness larger than the other portion is formed near a welded part 6 in an outer flange 2. That is, the aluminum alloy extruded material 1D has both the characteristics of the aluminum alloy extruded materials 1, 1A, and 1B shown in FIGS. 1 to 3 and the characteristics of the aluminum alloy extruded material 1C shown in FIG. 4. In the aluminum alloy extruded material 1D, the height h of the outer parts 4a and 5a in the webs 4 and 5 is preferably in the range of H×⅔ or more to H or less and the thickness Tw preferably exceeds tw and is tw×2.5 or less for the same reason as explained in the aluminum alloy extruded materials 1, 1A, and 1B. Further, in the aluminum alloy extruded material 1D, the width W of the thick portion 2a in the outer flange 2 is preferably in the range of 3 mm or more to D×⅓ or less and the thickness Tf is preferably tf×1.1 or more to tf×2.5 or less for the same reason as explained in the aluminum alloy extruded material 1C.

Meanwhile, although the number of the webs in a door beam is a pair (two) in the above explanations, the present invention includes a door beam having three or more webs. For example, an aluminum alloy extruded material 1E shown in FIG. 6 comprises a pair of flanges (outer flange 2 and inner flange 3) and three webs 4, 5, and 9 and outer parts 4a 5a, and 9a in the webs 4, 5, and 9 are thick. The outer flange 2 and the inner flange 3 have welded parts 6a, 7a, 6b, and 7b between the web 4 and the web 9 and between the web 5 and the web 9, respectively. Further, an aluminum alloy extruded material 1F shown in FIG. 7 comprises a pair of flanges (outer flange 2 and inner flange 3) and three webs 4, 5, and 9 and thick portions 2a and 2b having a thickness larger than the other portion are formed near welded parts 6a and 6b in the outer flange 2.

In this way, in the case of three or more webs too, a welded part in an outer flange exists between webs, the height h of an outer part (thickened part) of each web is preferably in the range of $H \times 2/3$ or more to H or less and the width W of a thick portion in the outer flange is preferably in the range of 3 mm or more to $D \times 1/3$ or less. Further, the thickness Tw of an outer part in a web preferably exceeds tw and in the range of $tw \times 2.5$ or less and the thickness Tf of a thick portion in the outer flange is preferably in the range of $tf \times 1.1$ or more to $tf \times 2.5$ or less. Here, even in the case of three or more webs, a welded part is preferably positioned near the center between webs but is not particularly limited.

A cross-sectional shape of webs and an outer flange explained above: tends to allow bending deformation of a door beam at the time of collision to concentrate near a loading point in the longitudinal direction; and works effectively in a door beam comprising a high strength aluminum alloy extruded material that tends to generate buckling of webs and an outer flange. In particular, it is suitable for a door beam comprising a 7000 series (Al—Zn—Mg—(Cu) series) aluminum alloy extruded material having a 0.2% proof stress of 450 MPa or more. A composition specified in JIS or the AA standard is applied to the composition of the 7000 series aluminum alloy. As a preferable composition, a composition containing Zn of 3.0% to 9.0% by mass, Mg of 0.4% to 2.5% by mass, Cu of 0.05% to 2.0% by mass, and Ti of 0.005% to 0.2% by mass and further at least one kind of Mn of 0.01% to 0.5% by mass, Cr of 0.01% to 0.3% by mass, and Zr of 0.01% to 0.3% by mass, with the balance consisting of Al and impurities can be named.

This application claims the benefits of priority to Japanese Patent Application No. 2019-096386, filed May 22, 2019. The entire contents of the above application are herein incorporated by reference.

What is claimed is:

1. An aluminum alloy door beam comprising:
an aluminum alloy extruded material of a hollow section structure having a welded part along a longitudinal direction and having an outer flange arranged outside in a vehicle body width direction, an inner flange arranged inside in the vehicle body width direction, and at least two webs connecting the outer flange and the inner flange,
wherein the welded part is formed in the outer flange and in a cross section of perpendicular to an extrusion direction of the aluminum alloy extruded material, each of the webs comprises an outer part connected to the outer flange and an inner part connected to the inner flange, the outer part is positioned in a region outside a cross section center of the aluminum alloy extruded material in the vehicle body width direction, and a thickness of the outer part is larger than a thickness of the inner part.

2. The aluminum alloy door beam according to claim 1, wherein, in the cross section of perpendicular to the extrusion direction of the aluminum alloy extruded material, when a height of the webs from the outer flange to the cross section center of the extruded material is defined as H, a height of the outer part is in the range of $2/3 H$ to H.

3. The aluminum alloy door beam according to claim 1, wherein a thick portion having a thickness larger than the other portion is formed near the welded part in the outer flange.

4. The aluminum alloy door beam according to claim 3, wherein, in the cross section of perpendicular to the extrusion direction of the aluminum alloy extruded material, when a distance between two webs connected to both the sides of the welded part in the outer flange is defined as D, a width of the thick portion is in the range of 3 mm or more to $1/3 D$ or less and a thickness of the thick portion is in the range of 1.1 to 2.5 times the thickness of the other portion.

5. The aluminum alloy door beam according to claim 1, wherein the aluminum alloy extruded material is a 7000 series aluminum alloy extruded material having a proof stress of 450 MPa or more.

6. An aluminum alloy door beam comprising:
an aluminum alloy extruded material of a hollow section structure having a welded part along a longitudinal direction has and having an outer flange arranged outside in a vehicle body width direction, an inner flange arranged inside in the vehicle body width direction, and at least two webs connecting the outer flange and the inner flange,
wherein the welded part is formed in the outer flange and in a cross section of perpendicular to an extrusion direction of the aluminum alloy extruded material, a thick portion having a thickness larger than the other portion is formed near the welded part in the outer flange.

7. The aluminum alloy door beam according to claim 6, wherein, in the cross section of perpendicular to the extrusion direction of the aluminum alloy extruded material, when a distance between two webs connected to both the sides of the welded part in the outer flange is defined as D, a width of the thick portion is in the range of 3 mm or more to $1/3 D$ or less and a thickness of the thick portion is in the range of 1.1 to 2.5 times the thickness of the other portion.

8. The aluminum alloy door beam according to claim 6, wherein the aluminum alloy extruded material is a 7000 series aluminum alloy extruded material having a proof stress of 450 MPa or more.

* * * * *